(12) United States Patent
Pietron et al.

(10) Patent No.: US 9,404,571 B2
(45) Date of Patent: Aug. 2, 2016

(54) CONTROLLING AN AUTOMATIC TRANSMISSION

(71) Applicant: FORD GLOBAL TECHNOLOGIES, LLC, Dearborn, MI (US)

(72) Inventors: Gregory M. Pietron, Canton, MI (US); Kevin D. Macfarlane, Northville, MI (US); Diana Yanakiev, Birmingham, MI (US); Joseph F. Kucharski, Livonia, MI (US); Bradley D. Riedle, Northville, MI (US); Stephen M. Cicala, Dearborn Heights, MI (US); Yuji Fujii, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 206 days.

(21) Appl. No.: 14/295,470

(22) Filed: Jun. 4, 2014

(65) Prior Publication Data
US 2015/0354698 A1 Dec. 10, 2015

(51) Int. Cl.
*F16H 61/04* (2006.01)
*F16H 61/26* (2006.01)
*F16H 61/00* (2006.01)

(52) U.S. Cl.
CPC ............. *F16H 61/04* (2013.01); *F16H 61/26* (2013.01); *F16H 2061/0075* (2013.01); *F16H 2061/0087* (2013.01)

(58) Field of Classification Search
None
See application file for complete search history.

(56) References Cited

U.S. PATENT DOCUMENTS

| | | | |
|---|---|---|---|
| 3,752,011 A | 8/1973 | Casey et al. | |
| 4,527,678 A | 7/1985 | Pierce et al. | |
| 4,653,350 A | 3/1987 | Downs et al. | |
| 4,790,418 A | 12/1988 | Brown et al. | |
| 4,799,158 A | 1/1989 | Patil | |
| 4,821,190 A | 4/1989 | Patil | |
| 5,058,460 A | 10/1991 | Hibner et al. | |
| 5,129,286 A | 7/1992 | Nitz et al. | |
| 5,157,608 A | 10/1992 | Sankpal et al. | |
| 5,197,006 A | 3/1993 | Saitou et al. | |
| 5,473,543 A | 12/1995 | Nozaki et al. | |
| 5,938,712 A | 8/1999 | Ibamoto et al. | |
| 6,319,170 B1 | 11/2001 | Hubbard et al. | |
| 6,364,811 B1 | 4/2002 | Hubbard et al. | |
| 6,385,520 B1 | 5/2002 | Jain et al. | |
| 6,415,213 B1 | 7/2002 | Hubbard et al. | |
| 6,577,939 B1 * | 6/2003 | Keyse ................... | F16H 61/061 477/34 |
| 6,887,184 B2 | 5/2005 | Buchanan et al. | |
| 7,212,898 B2 | 5/2007 | Whitton et al. | |
| 7,216,025 B2 | 5/2007 | Keyse et al. | |
| 7,356,398 B2 | 4/2008 | Steinmetz et al. | |
| 7,603,219 B2 | 10/2009 | Joshi et al. | |
| 2006/0089775 A1 | 4/2006 | Whitton et al. | |

(Continued)

*Primary Examiner* — Edwin A Young
(74) *Attorney, Agent, or Firm* — James Dottavio; MacMillan, Sobanski & Todd, LLC

(57) ABSTRACT

A method of downshifting an automotive transmission. An on-coming transmission element is stroked while pressure for an off-going element is reduced. Pressure for the stroked on-coming element is increased to be sufficient to carry torque. Pressure for the off-going element is reduced below a torque transmitting amount once the stroked on-coming element has a sufficient torque carrying capacity. Torque capacities for the elements are determined from transmission output torque and acceleration and transmission input torque and acceleration. Feed forward or feedback terms for off-going and on-coming element torque capacities may be calculated using the transmission output torque, transmission input acceleration, and transmission input torque.

20 Claims, 5 Drawing Sheets

(56) References Cited

U.S. PATENT DOCUMENTS

| | | | |
|---|---|---|---|
| 2006/0100060 A1* | 5/2006 | Kraska | B60K 6/405 477/156 |
| 2010/0228412 A1 | 9/2010 | Sah | |
| 2010/0318269 A1 | 12/2010 | Yanakiev et al. | |
| 2011/0028272 A1* | 2/2011 | Bai | B60W 10/06 477/109 |
| 2011/0275479 A1 | 11/2011 | Atmaram et al. | |
| 2012/0130610 A1 | 5/2012 | Lee et al. | |
| 2013/0153353 A1* | 6/2013 | Teslak | B60W 10/02 192/3.54 |

\* cited by examiner

| Gear | Friction element application chart | | | | |
| --- | --- | --- | --- | --- | --- |
| | #95 | #96 | #97 | #98 | #99 |
| 1 | X | | | X | |
| 2 | X | | X | | |
| 3 | X | X | | | |
| 4 | X | | | | X |
| 5 | | X | | | X |
| 6 | | | X | | X |
| Rev | | X | | X | |

| Stage | ONC | OGC | Input shaft torque | Desired output shaft torque | Desired shift rate |
|---|---|---|---|---|---|
| 1 | Approximated as zero | Calculated | Calculated | Set to desired output torque | Set to desired shift duration |
| 2 | Approximated as zero | Calculated | Calculated | Set to desired output torque | Set to desired shift duration |
| 3 | Approximated as zero | Calculated | Calculated | Set to desired output torque | Set to desired shift duration |
| 4A | Detected amount used | Holding torque calculated | Calculated | Set to desired output torque | Set to zero or to follow vehicle trajectory |
| 4B | Calculated | Ramped to zero | Calculated | Set to desired output torque | Set to zero or to follow vehicle trajectory |
| 5 | One of:<br>1. ONC and input shaft torque calculated while OGC ramped to zero<br>2. OGC and input shaft torque calculated while ONC controlled to zero slip speed<br>3. ONC and OGC calculated while input shaft torque is controlled | | | Set to desired output torque | Set to zero or to follow vehicle trajectory |

Fig. 5

CONTROLLING AN AUTOMATIC TRANSMISSION

BACKGROUND OF INVENTION

The present invention relates to a method of controlling an automatic transmission.

An automatic transmission for a powertrain of a vehicle may use multiple friction elements to shift between gear ratios. A known method of shifting the transmission between gear ratios involves releasing an off-going clutch while engaging an on-coming clutch to change a kinetic pathway through the transmission.

However, if the on-coming clutch has insufficient torque capacity when the off-going clutch is released, then an uncontrolled rise in engine speed may occur. The uncontrolled rise in engine speed may result in noise, vibration, and harshness that reduce driveability of the vehicle.

SUMMARY OF INVENTION

An embodiment contemplates a method of controlling an automatic transmission. An on-coming element is stroked while pressure for an off-going element is reduced. Pressure for the stroked on-coming element is increased. Once the stroked on-coming element has a torque capacity sufficient to shift gear ratios, pressure for the off-going element is reduced below a torque transmitting amount. Torque capacities for the elements are determined from transmission output torque and acceleration and transmission input torque and acceleration.

Another embodiment contemplates a method of controlling an automatic transmission. In response to a downshift from a current to a new gear ratio, an off-going torque capacity is reduced to a first capacity and an engine torque is adjusted to a first torque. The first capacity and torque are based on an on-coming torque capacity approximated as zero, transmission output torque, and shift rate. The on-coming torque capacity is adjusted to an undetectable capacity greater than a stroke capacity while essentially simultaneously increasing the off-going torque capacity from the first capacity to a second capacity. The second capacity is based on the on-coming torque capacity approximated as zero, transmission output torque, and shift rate. The on-coming torque capacity is increased from the undetectable capacity to a measurable capacity and the off-going torque capacity is adjusted from the second capacity to a holding capacity. The holding capacity is based on the transmission output torque and shift rate. The off-going torque capacity is reduced from the holding capacity to zero while adjusting, based on the transmission output torque and shift rate, the engine torque and on-coming torque capacity from the measurable capacity.

Another embodiment contemplates a method of controlling an automatic transmission. In response to a downshift from a current gear ratio to a new gear ratio, an off-going torque capacity is reduced to a first capacity and an engine torque adjusted to a first torque. The first capacity and torque are based on an on-coming torque capacity approximated as zero, transmission output torque, and shift rate. The on-coming torque capacity is adjusted to a new capacity to produce an intermediate gear ratio within a range of the new gear ratio. A dog clutch is engaged while an off-going element is slipping. The on-coming torque capacity exceeding a minimum capacity to complete the downshift is detected. The downshift is completed when the minimum capacity is detected.

An advantage of an embodiment is that the likelihood of the on-coming element having an insufficient torque capacity is reduced. This improves the driving experience for a vehicle driver.

BRIEF DESCRIPTION OF DRAWINGS

FIG. 5 is a table summarizing calculations for a power-on downshift.

DETAILED DESCRIPTION

Figure 1:
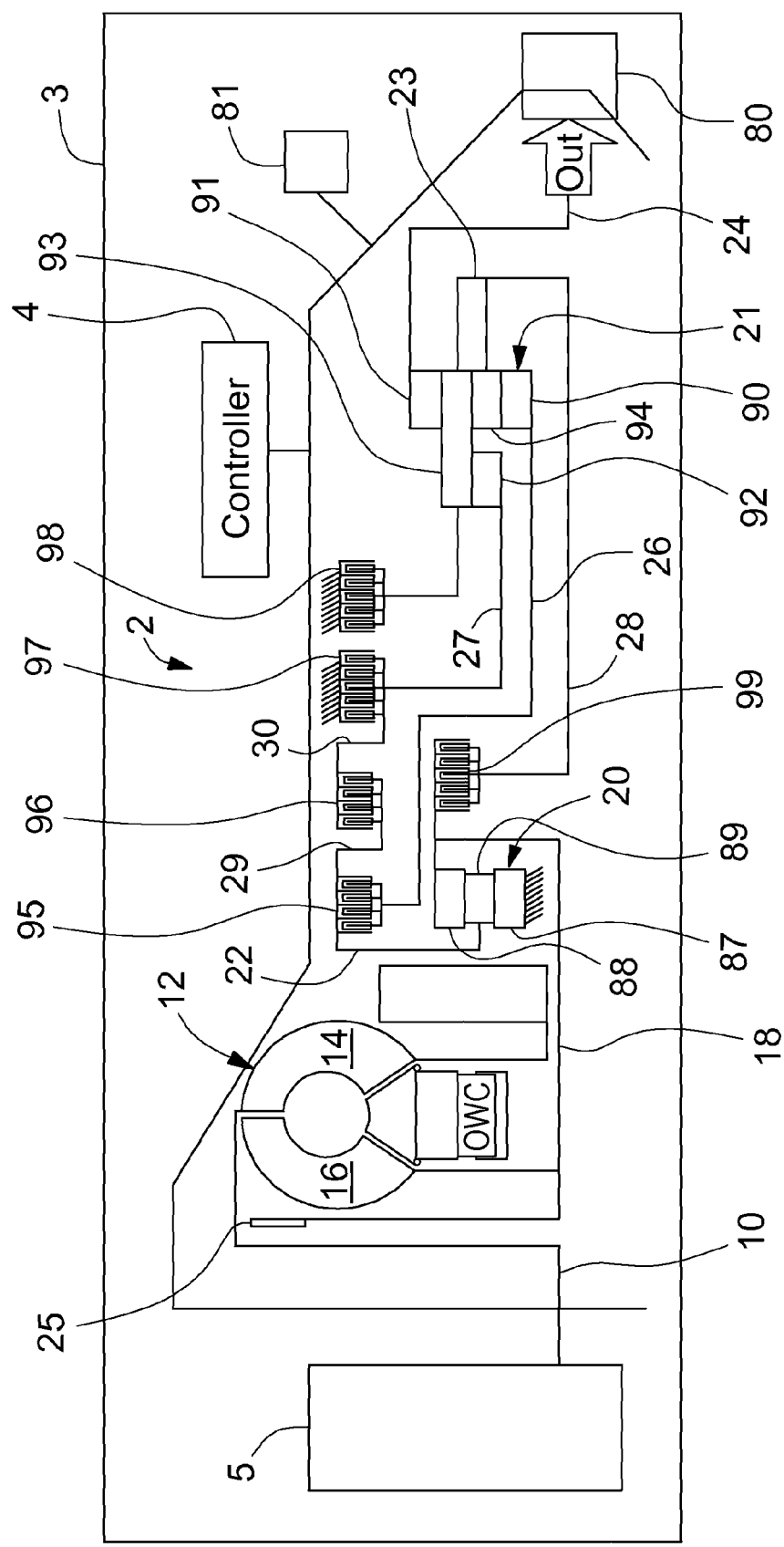
FIG. 1 is a schematic view of an automatic transmission.

FIG. 1 schematically illustrates an automatic transmission 2, for a vehicle 3, wherein gear ratio changes are controlled by friction elements acting on individual gear elements. A controller 4 controls the transmission 2. Engine torque from a vehicle engine 5 is carried to a torque input shaft 10 of a hydrokinetic torque converter 12. The vehicle engine 5 may be an internal combustion engine. Alternatively, an electrical machine, such as a traction motor or motor/generator, may be used, in conjunction with or without, the internal combustion engine. An impeller 14 of the torque converter 12 develops turbine torque on a turbine 16. Turbine torque is transmitted to the transmission 2 on a turbine shaft, which is also a transmission input shaft 18. The transmission 2 includes a simple planetary gearset 20 and a compound planetary gearset 21.

The simple gearset 20 has a permanently fixed sun gear 87, a ring gear 88, and planetary pinions 89, rotatably supported on a carrier 22 and meshing with the sun gear 87 and ring gear 88. The transmission input shaft 18 is drivably connected to the ring gear 88.

The compound gearset 21, sometimes known as a Ravigineaux gearset, has a small pitch diameter sun gear 90, a torque output ring gear 91, a large pitch diameter sun gear 92, and compound planetary pinions. The compound planetary pinions include long pinions 93, which mesh with short planetary pinions 94 and the torque output ring gear 91. The short planetary pinions 94 further mesh with the sun gear 90. The planetary pinions 93 and 94 are rotatably supported on a compound carrier 23. The ring gear 91 is drivably connected to a torque output shaft 24, which is drivably connected to vehicle traction wheels through a drive assembly 80.

The simple gearset 20 is an underdrive ratio gearset arranged in series with respect to the compound gearset 21. The torque converter 12 preferably includes a lockup or torque converter bypass clutch 25, which directly connects the transmission input shaft 18 to the engine 5 via the torque input shaft 10, after a torque converter torque multiplication mode is completed and a hydrokinetic coupling mode begins.

Sensors 81 monitor the transmission 2, including acceleration and torque at the input shaft 18 and output shaft 24.

Figures 2, 3:
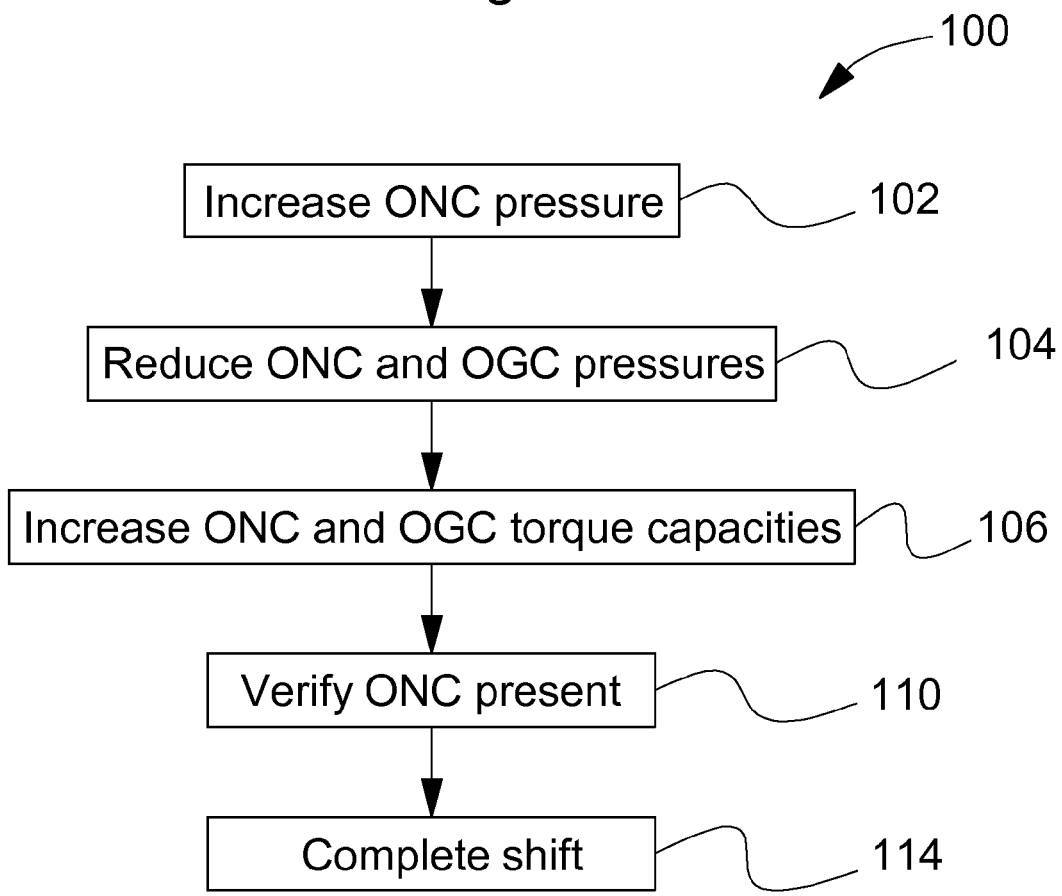
FIG. 2 is a table of clutch states for the transmission of FIG. 1.
FIG. 3 is a flowchart illustrating a routine for a power-on downshift.

FIG. 2 illustrates friction element states for the transmission 2 and will be discussed with reference to FIG. 1. Illustrated in FIG. 2 are clutch and brake friction element engagement and release patterns for establishing each of six forward gear ratios and a single reverse gear ratio for the transmission 2.

During operation in the first four forward driving gear ratios, the carrier 89 is drivably connected to the sun gear 90 through a shaft 26 and a forward clutch 95. During operation in third, fifth and reverse gear ratios, a direct clutch 96 drivably connects the carrier 22 to a shaft 27, which is connected to the large pitch diameter sun gear 92. During operation in fourth, fifth and sixth forward driving gear ratios, an overdrive brake 99 connects the turbine shaft 18 to the compound carrier 23 through a shaft 28.

A friction brake 97 acts as a torsion reaction brake for the sun gear 92 during operation in second and the sixth forward driving gear ratios. During operation of the third forward driving gear ratio, the direct friction brake B is applied together with the forward friction clutch 95. The elements of the compound gearset 21 are then locked together to effect a direct driving connection between the shaft 28 and output shaft 26.

The forward friction clutch 95 is connected through a torque transfer element 29 to the direct friction clutch 96, during forward drive. A torque output side of the direct friction clutch 96, during forward drive, is connected to the shaft 27 through a torque transfer element 30. Reverse drive is established by applying a low-and-reverse brake 98 and the friction clutch 96 concurrently.

As is understood by one skilled in the art, shifting gear ratios for the transmission 2 involves three phases. Shifting involves an on-coming element (ONC) and an off-going element (OGC). For example, depending on the gear ratio being shifted, the on-coming or off-going element may be one of the forward friction clutch 95, the direct friction clutch 96, the friction brake 97, the low-and-reverse brake 98, or the overdrive brake 99.

In a preparatory phase, the on-coming element is stroked while engagement of the off-going element is reduced. For example, when the off-going element is pressure operated, the pressure for the off-going element is reduced, but still sufficient to carry torque. As understood by one skilled in the art, a stroked clutch places plates of the clutch close to contact without transmitting torque.

Next, during a torque phase, the on-coming element is engaged to develop torque carrying capacity. The off-going element begins the torque phase engaged, but is disengaged once the on-coming element has developed a sufficient torque carrying capacity.

Lastly, during an inertia phase, a slip speed for the on-coming element is adjusted towards zero. Shifting is completed once the on-coming element has reached the zero slip speed.

A desired shift rate is equal to acceleration at the input shaft 18.

Torque capacities of on-coming and off-going elements during a downshift from a current gear ratio to a new gear ratio may be calculated. The on-coming and off-going torque capacities may be calculated as functions of torque and acceleration for the input shaft 18 and torque and acceleration for the output shaft 24:

$$\tau_{ogc} = [\tau_{os} + I_{os}\alpha_{os} - (Y_{onc}/X_{onc})(\tau_{is} - I_{is}\alpha_{is})][Y_{ogc} - (Y_{onc}/X_{onc})(X_{ogc})] \quad \text{(EQN. 1)}$$

and $$\tau_{onc} = (\tau_{is} - I_{is}\alpha_{is} - X_{ogc}\tau_{ogc})/X_{onc} \quad \text{(EQN. 2)},$$

wherein $\tau_{ogc}$ is the off-going element torque capacity, $\tau_{os}$ is torque at the output shaft 24, $I_{os}$ is an inertia of the transmission 2 at the output shaft 24, $\alpha_{os}$ is acceleration at the output shaft 24, $Y_{onc}$ is an on-coming element torque capacity contribution to the output shaft acceleration, $X_{onc}$ is an on-coming element torque capacity contribution to an acceleration at the input shaft 18, $\tau_{is}$ is torque at the input shaft 18, $I_{is}$ a lumped effective inertia at the input shaft 18, $\alpha_{is}$ is the input shaft acceleration, $Y_{ogc}$ is an off-going element torque capacity contribution to the output shaft acceleration, $X_{ogc}$ is an off-going element torque capacity contribution to the input shaft acceleration, and $\tau_{onc}$ is the on-coming element torque capacity.

A dynamic state for the transmission 2 may be described as:

$$I_v\alpha_w = R_d\tau_{os} - r_w(c_1 + c_2 r_w^2 \omega_w^2) - \tau_b + e_r \quad \text{(EQN. 3)},$$

wherein $I_v$ is the effective inertia at the traction wheels, including the vehicle 3, $\alpha_w$ is acceleration at the traction wheels, $R_d$ is a final drive ratio and tire radius, $r_w$ is an effective radius of the traction wheels, $c_1$ is an empirical constant that accounts for rolling resistance, $c_2$ is an empirical constant that accounts for aerodynamic drag, $\omega_w$ is angular velocity at the traction wheels, $\tau_b$ is foundational brake torque at the traction wheels, and $e_r$ is an empirical constant that comprises modeling error and unknown disturbances. For example, $e_r$ may account for grade or tire damping. Angular velocity at the traction wheels includes tire and suspension dynamics. Tire and suspension dynamics are not significant for calculating on-coming and off-going torque capacities because tire and suspension dynamics are much faster than a road load effect on acceleration of the traction wheels. Angular velocity of the traction wheels is measured by any suitable technique known to one skilled in the art.

Torque at the output shaft 24 is another dynamic state. As understood by one skilled in the art, Hooke's Law (F=kx) relates overall shaft torque to a twist angle between the traction wheels and the output shaft 24. Differentiation with respect to time yields a dynamic equation for torque at the output shaft 24:

$$d\tau_{os}/dt = K_s(\omega_{os} - R_d\omega_w) \quad \text{(EQN. 4)}$$

wherein $K_s$ is a lumped spring constant and $\omega_{os}$ is angular velocity of the output shaft 24.

When the transmission 2 is not shifting, a transmission gear ratio is simply a scalar and the angular velocity of the input shaft 18 and output shaft 24 are not independent states. Thus, only the input shaft 18 is in a dynamic state:

$$I_{is}\alpha_{is} = R_d\tau_{is} - \tau_{os}/R_g \quad \text{(EQN. 5)},$$

wherein $R_g$ is the current gear ratio.

However, when the transmission 2 is shifting, the on-coming and off-going elements dissipate some torque transmitted through the transmission 2 and decouple the angular velocity of the input shaft 18 from the output shaft 24. Angular velocity of the input shaft 18, while the transmission 2 is performing the shift, is a function of the on-coming and off-going elements involved in shifting. At the same time, angular velocity of the output shaft 24 is a function of the shifting on-coming and off-going elements, as well as torque at the output shaft 24. This is described by:

$$I_{is}\alpha_{is} = \tau_{is} - X_{ogc}\tau_{ogc} - X_{onc}\tau_{onc} \quad \text{(EQN. 6a) and}$$

$$I_{os}\alpha_{os} = Y_{ogc}\tau_{ogc} + Y_{onc}\tau_{onc} - T_{os} \quad \text{(EQN. 6b)}.$$

As is readily apparent, EQN.'s 6a and 6b may be solved algebraically to produce EQN.'s 1 and 2. EQN.'s 6a and 6b are valid for both the torque and inertia phases with the on-coming element torque capacity contribution to the output shaft acceleration ($Y_{onc}$), the on-coming element torque capacity contribution to an acceleration at the input shaft 18 ($X_{onc}$), the off-going element torque capacity contribution to the output shaft acceleration ($Y_{ogc}$), and the off-going element torque capacity contribution to the input shaft acceleration ($X_{ogc}$) varied for a specific state of the friction elements—i.e., the combination of friction elements that are on and off. Additionally, EQN.'s 6a and 6b are accurate at all times for a dual-shaft transmission.

During the inertia phase, a more detailed model is needed to accurately reflect inertias involved in shifting. As is known to one skilled in the art, the planetary gearsets 20 and 21 include an inertial coupling across the transmission 2 during shifting due to transients of internal rotational components caused by the elements changing the kinematic arrangement of the planetary gearsets 20 and 21. EQN.'s 6a and 6b may be rewritten in matrix form to reflect the inertial coupling:

$$[I]_{2\times 2}\begin{bmatrix}\alpha_{is}\\ \alpha_{os}\end{bmatrix}=\begin{bmatrix}1 & -X_{ogc} & -X_{onc} & 0\\ 0 & Y_{ogc} & Y_{onc} & -1\end{bmatrix}\begin{bmatrix}\tau_{is}\\ \tau_{ogc}\\ \tau_{onc}\\ \tau_{os}\end{bmatrix}. \quad \text{(EQN. 7)}$$

EQN. 7 is applicable during both the torque and inertia phases of shifting and may be solved algebraically to determine the on-coming and off-going torque capacities during the inertia phase.

Inertia matrix [I] is not diagonal in a general case. Described herein is determination of the inertia matrix for the transmission 2. One skilled in the art will be able to apply this description for determining the inertia matrix for other transmissions. For example, one skilled in the art will be able to apply this description to determine the inertia matrix for a transmission having fewer or more gear ratios than the transmission 2.

For the purpose of illustrating one, non-limiting, example calculating the inertia matrix for a synchronous gear ratio 2-1 downshift produced by the transmission 2, it will be assumed that the downshift occurs between a second gear ratio and a first gear ratio. During the 2-1 downshift, the forward friction clutch 95 remains engaged, the friction brake C starts in the engaged state before the downshift and is disengaged during the downshift, the low-and-reverse friction brake 98 starts in the disengaged position before the downshift and is released during the downshift. The friction clutch 96 and override friction brake 99 remain disengaged throughout the downshift. The friction brake 97 is the off-going element and the friction brake 98 is the on-coming element.

The dynamic equations of each rotational component during the downshift are as follow:

$$I_R\alpha_{os}=I_R\alpha_{91}=\tau_{91}-\tau_{os} \quad \text{(EQN. 8a)},$$

$$I_{90}\alpha_{90}=-\tau_{90}-\tau_{95} \quad \text{(EQN. 8b)},$$

$$I_{93}\alpha_{93}=-\tau_{93}-\tau_{98}+\tau_{99} \quad \text{(EQN. 8c)},$$

$$I_{92}\alpha_{92}=-\tau_{92}+\tau_{96}-\tau_{97} \quad \text{(EQN. 8d)},$$

$$I_{89}\alpha_{89}=\tau_{89}-\tau_{95}-\tau_{96} \quad \text{(EQN. 8e), and}$$

$$I_{88}\alpha_{is}=I_{88}\alpha_{88}=\tau_{is}-\tau_{88}-\tau_{99} \quad \text{(EQN. 8f)}$$

wherein, for the forward friction clutch 95, direct friction clutch 96, friction brake 97, low-and-reverse brake 98, overdrive brake 99, ring gear 91, output shaft 24, sun gear 90, pinion 93, sun gear 92, pinion 89, ring gear 88, and input shaft 18, I is the inertia, $\alpha$ is the angular acceleration, and $\tau$ is the torque carried. $I_R$ is the sum of inertia for the output shaft 24 and ring gear 91. The inertia terms I include the corresponding clutch plates attached to the gear component.

Kinematic constraints of the planetary gearsets 20 and 21 provide the following speed and acceleration relationships for the simple gearset 20:

$$\alpha_{89}=[N_{88}/(N_{87}+N_{88})][\alpha_{88}] \quad \text{(EQN. 9)}$$

and for the compound gearset 21:

$$\alpha_{93}=[N_{92}/(N_{92}+N_R)][\alpha_{92}]+[N_R/(N_{92}+N_R)][\alpha_{91}] \quad \text{(EQN. 10a) and}$$

$$\alpha_{93}=[-N_{90}/(-N_{90}+N_R)][\alpha_{90}]+[N_R/(-N_{90}+N_R)][\alpha_{91}] \quad \text{(EQN. 10b).}$$

Torque balances of the gearsets 20 and 21 may also be derived using kinematic constraints of the gearsets 20 and 21 using any suitable method known to one skilled in the art. For example, the torque balances may be computed using a Bond graph method. The resulting torque balances are:

$$\hat{O}_{89}=[(N_{88}+N_{87})/N_{88}][\hat{O}_{88}] \quad \text{(EQN. 11)},$$

$$\hat{O}_R=\hat{O}_{90}+\hat{O}_{92}+\hat{O}_{93} \quad \text{(EQN. 12), and}$$

$$\hat{O}_R=(N_R/N_{90})\hat{O}_{90}-(N_R/N_{92})\hat{O}_{92} \quad \text{(EQN. 13).}$$

EQN.'s 8-13 are not reducible to a general equation set valid for any shift involving a single on-coming element and a single off-going element because a holding clutch remaining locked during the shift is different for each gear ratio change. As a result, the reduced system of equations is specific to a specific shift.

Next, intermediate torques are eliminated from EQN. 8 by using the torque balances in EQN.'s 11-13. Adding EQN.'s 8a-8d and using EQN. 12 produces:

$$I_R\alpha_{os}+I_{90}\alpha_{90}+I_{93}\alpha_{93}+I_{92}\alpha_{92}=-\tau_{os}+\tau_{95}-\tau_{98}+\tau_{99}+T_{96}-T_{97} \quad \text{(EQN. 14)},$$

adding EQN.'s 8a, 8b, and 8d, and using EQN. 13 yields:

$$I_R\alpha_{os}+I_{90}(N_R/N_{90})\alpha_{90}-I_{92}(N_R/N_{92})\alpha_{92}=-\tau_{os}+(N_R/N_{90})\tau_{95}-(N_R/N_{92})\tau_{96}+(N_R/N_{92})\tau_{97} \quad \text{(EQN. 15), and}$$

adding EQN.'s 8e and 8f, and using EQN.'s 9 and 11 gives:

$$[I_{88}+I_{89}(N_{88}/(N_{87}+N_{88}))^2]\alpha_{is}=\tau_{is}-(N_{88}/(N_{87}+N_{88}))\tau_{95}-(N_{88}/(N_{87}+N_{88}))\tau_{96}-\tau_{99} \quad \text{(EQN. 16).}$$

EQN.'s 14-16 are general for all states of the transmission. As discussed, the holding clutch remains locked while shifting, which provides an additional kinematic constraint needed to eliminate all accelerations internal to the transmission 2. Namely, EQN.'s 9 and 10 and the holding clutch constraint leave only the acceleration terms for the input shaft 18 and output shaft 24, similar to EQN. 7. Two clutches are open while shifting; hence the open clutches carry no torque (the friction clutch 96 and override friction brake 99). The holding clutch is also a dependent variable that may be eliminated. The result is the desired system of EQN. 7. As previously discussed, EQN. 7 is EQN.'s 6a and 6b in matrix form and EQN.'s 1 and 2 are derivable from EQN.'s 6a and 6b.

EQN.'s 1 and 2 may be used to calculate either feed forward or feedback terms. When EQN.'s 1 and 2 are used to calculate the feed forward term, there are five variables: a desired torque at the output shaft 24, a desired acceleration at the input shaft 18 (i.e., a desired shift rate), an on-coming element (ONC) torque capacity, an off-going element (OGC) torque capacity, and an engine torque transmitted via the input shaft 18 (i.e., torque at the input shaft 18). As will be discussed, for different stages of shifting, three of the variables will be known and two variables solved for. When EQN.'s 1 and 2 are used to calculate the feedback term, data from the sensor 81 is used. For example, the feedback term may be the on-coming and off-going torque capacities calculated using EQN.'s 1 and 2 using acceleration and torque measured at the input shaft 18 and output shaft 24. The on-coming or off-going torque capacity feedback term may be used to adjust on-coming and off-going element pressures.

Figure 4:
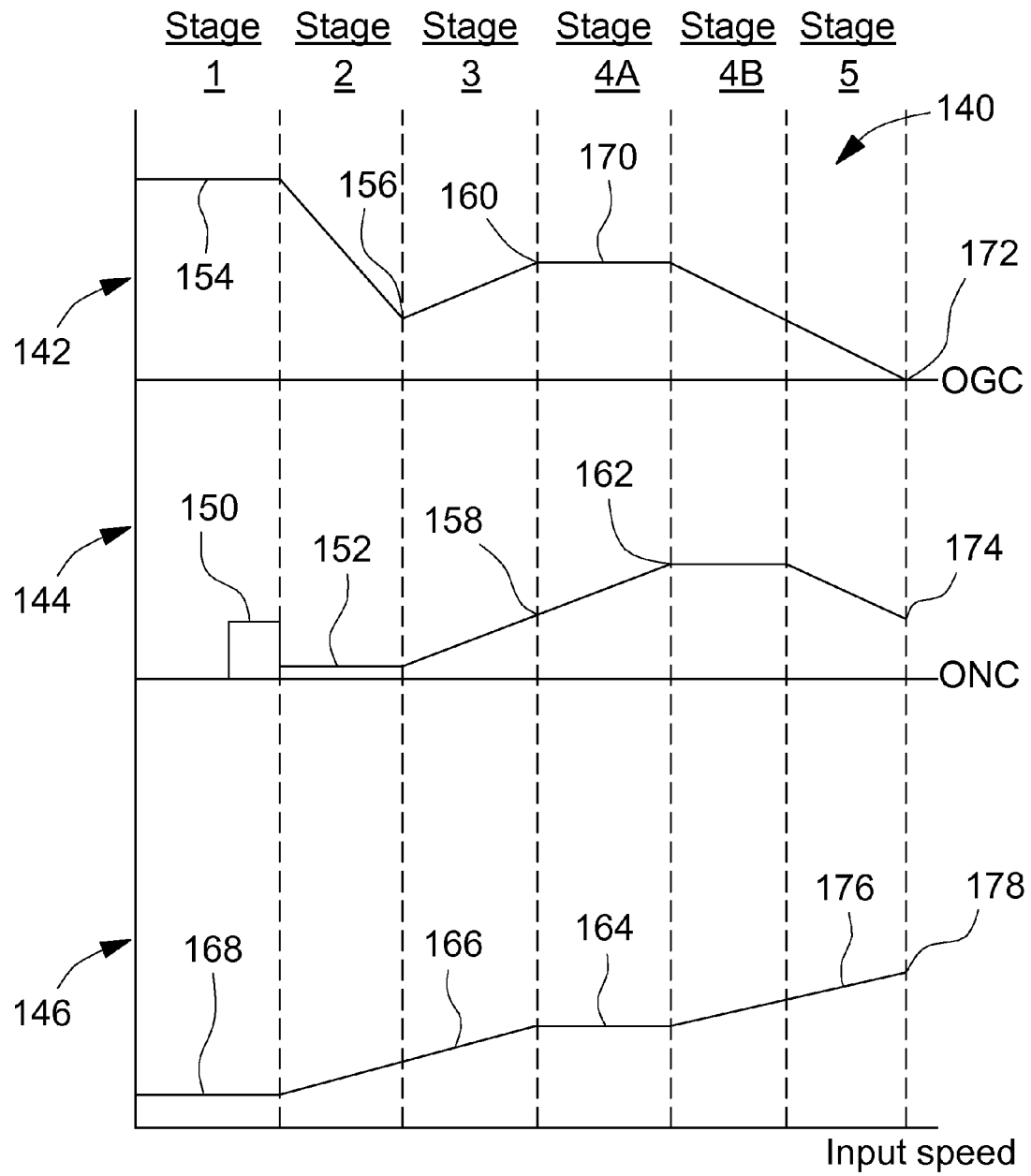
FIG. 4 is a graph illustrating a routine for a power-on downshift.

A routine 100 will be discussed with reference to FIGS. 3 and 4. The routine 100 is for a power-on downshift for the transmission 2 from the current gear ratio to the new gear ratio and is a non-limiting example of a control routine to downshift the transmission 2. FIG. 3 illustrates the routine 100. FIG. 4 illustrates a graph 140 of the routine 100 and has an off-going element torque capacity plot 142, an on-coming element torque capacity plot 144, and a plot 146 of speed at the input shaft 18. As one skilled in the art will understand, the graph 140 is a non-limiting example and the plots 142, 144, and 146 may vary as conditions vary. FIGS. 3 and 4 will be discussed with reference to FIG. 1.

As discussed, the on-coming or off-going element may be the forward friction clutch 95, the direct friction clutch 96, the friction brake 97, the low-and-reverse brake 98, or the overdrive brake 99.

The on-coming and off-going elements are actuated by any suitable means known to one skilled in the art to adjust the on-coming and off-going torque capacities. For example, the on-coming and off-going elements may be pressure actuated. The on-coming and off-going elements are actuated by the controller 4.

During a first stage, in a step 102 and in response to the power-on downshift command, the controller 4 increases the on-coming torque capacity to a capacity 150 above a stroke capacity, but remaining undetectable to an occupant of the vehicle 3, to provide feedback for the stroke capacity—i.e., the on-coming element is stroked. The on-coming torque capacity is then reduced, in a step 104, to a preliminary on-coming torque capacity 152 approximated as zero. Also, in the step 104 during a second stage, the off-going torque capacity is reduced from a starting torque capacity 154 to a preliminary off-going torque capacity 156. Further, in the step 104, torque of the engine 5 is adjusted to a preliminary torque corresponding to the desired shift rate. EQN.'s 1 and 2 are used in the steps 102 and 104 to calculate the preliminary off-going torque capacity and preliminary torque as functions of the desired torque at the output shaft 24 and desired shift rate while the on-coming torque capacity is approximated as zero.

During a third stage, in a step 106, the off-going and on-coming torque capacities are increased essentially simultaneously until downshifting is slightly over or under the new gear ratio. For example, the step 106 may be performed once a specified percentage of downshifting is complete. The on-coming torque capacity is increased to an undetectable amount 158 (undetectable to the occupant of the vehicle 3), just above the stroke capacity. The undetectable amount is a small value, such as 5-10 N·m. The off-going torque capacity is increased to an increased torque capacity 160. EQN.'s 1 and 2 are used in the step 106 to calculate the off-going torque capacity and the torque at the input shaft 18 as functions of the desired torque at the output shaft 24 and desired shift rate while the on-coming torque capacity is approximated as zero.

The slip speed between the on-coming and off-going elements may be accomplished using a closed loop control. For example, the engine 5, on-coming element, and off-going element may be controlled via a multi-input/multi-output (MIMO) closed loop control of the controller 4. Alternatively, the slip speed may be controlled by the engine 5 while open loop ramping is used to control the on-coming and off-going elements. Alternatively, a desired torque profile may be calculated for the output shaft 24, which is coordinated with torque at the input shaft 18 and the on-coming and off-going torque capacities to obtain the desired torque at the output shaft 24 and a desired slip speed. As discussed, EQN.'s 1 and 2 may be used to calculate the feedback terms for use in closed loop control of the slip speed.

For example, the MIMO control of the controller 4 may receive the desired torque at the output shaft 24, the desired shift rate, and a prescribed trajectory for one of engine torque, the on-coming torque capacity, and the off-going torque capacity. The MIMO control of the controller 4 adjusts commanded engine torque, on-coming torque capacity, and off-going torque capacity as a function of the desired value for each and a set of measured values. The measured values are acceleration and speed at the input shaft 18 and output shaft 24, a speed ratio of the torque converter 12, and torque at the output shaft 24. For example, the measured values may be detected by the sensor 81. EQN.'s 1 and 2 may be used to calculate the measured on-coming and off-going torque capacities used by the MIMO control of the controller 4 to adjust the commanded engine torque, on-coming torque capacity, and off-going torque capacity.

In a step 110, the controller 4 may verify whether the on-coming element is present at the stop gear ratio—i.e, verifying that the on-coming element has sufficient torque capacity to complete shifting. The on-coming torque capacity is ramped up to a detectable amount 162. For example, the detectable amount may be between 10-20 N·m. The detectable amount may be measured using a torque sensor or a speed sensor. Alternatively, as known to one skilled in the art, the detectable amount may be measured mathematically, independently of EQN.'s 1 and 2. Speed of the engine 5 is held at a holding speed 164 so the new gear ratio is maintained while the on-coming torque capacity is detected. The holding speed 164 is arrived at after a first engine speed ramp up 166 from a first synchronous speed 168 in the current gear ratio. The off-going torque capacity is ramped from the increased capacity 160 to a holding capacity 170 to hold torque at the input shaft 18 and drag torque from the on-coming element. Upon verifying the on-coming element is present, the off-going torque capacity is reduced to zero while the torque at the input shaft 18 and the on-coming torque capacity are adjusted.

If the on-coming element is not detected within a time period, then the on-coming torque capacity is increased. If the on-coming element is still not detected, then the routine 100 may assume a failure. When the failure is assumed, the routine 100 may downshift two gear ratios from the current gear ratio or return to the current gear ratio.

During a stage 4A of the step 110, prior to detecting the oncoming torque capacity, EQN.'s 1 and 2 are used in the step 110 to calculate the off-going torque capacity and torque at the input shaft 18 as a function of the on-coming torque capacity, the desired torque at the output shaft 24, and the desired shift rate (either set to zero or, as understood by one skilled in the art, to follow a vehicle trajectory reflected in the input shaft 18). During a stage 4B of the step 110, after detecting the on-coming torque capacity, EQN.'s 1 and 2 are used in the step 110 to calculate on-coming torque capacity and torque at the input shaft 18 as functions of the desired torque at the output shaft 24 (now ramped to a final torque value) and the desired shift rate (either set to zero or to follow the vehicle trajectory reflected in the input shaft 18) while the off-going torque capacity is ramped towards a zero capacity 172.

During a fifth stage, in the step 114, the downshift is completed while the on-coming torque capacity, the off-going torque capacity, and torque at the input shaft 18 are coordinated using EQN.'s 1 and 2 to produce a monotonic torque profile while the desired torque at the output shaft 24 is set to a known desired torque and the desired shift rate is set to zero or to follow the vehicle trajectory reflected by the input shaft 18. The off-going torque capacity may be reduced to zero while the on-coming torque capacity and torque at the input shaft 18 are calculated for the desired torque at the output shaft 24. Alternatively, the on-coming torque capacity may be controlled to achieve a zero slip speed 174 while the off-going torque capacity and torque at the input shaft 18 are calculated for the desired torque at the output shaft 24. Alternatively, torque at the input shaft 18 may be controlled while the on-coming and off-going torque capacities are calculated for the desired torque at the output shaft 24. A second input speed ramp up 176 increases speed of the engine 5 from the holding speed 164 to a second synchronous speed 178 in the new gear ratio.

When the on-coming torque capacity is insufficient to complete downshifting, the on-coming torque capacity may be further increased. If the on-coming torque capacity remains insufficient after increase, the transmission 2 may downshift two gear ratios from the current gear ratio or return to the current gear ratio.

When downshifting is interrupted, the on-coming element pressure is reduced and the off-going torque capacity is increased to return to the current gear ratio. Re-applying the off-going element stops downshifting. After the current gear ratio is achieved, the off-going torque capacity is further increased.

FIG. 5 is a table summarizing calculations for the routine 100.

Figure 6:
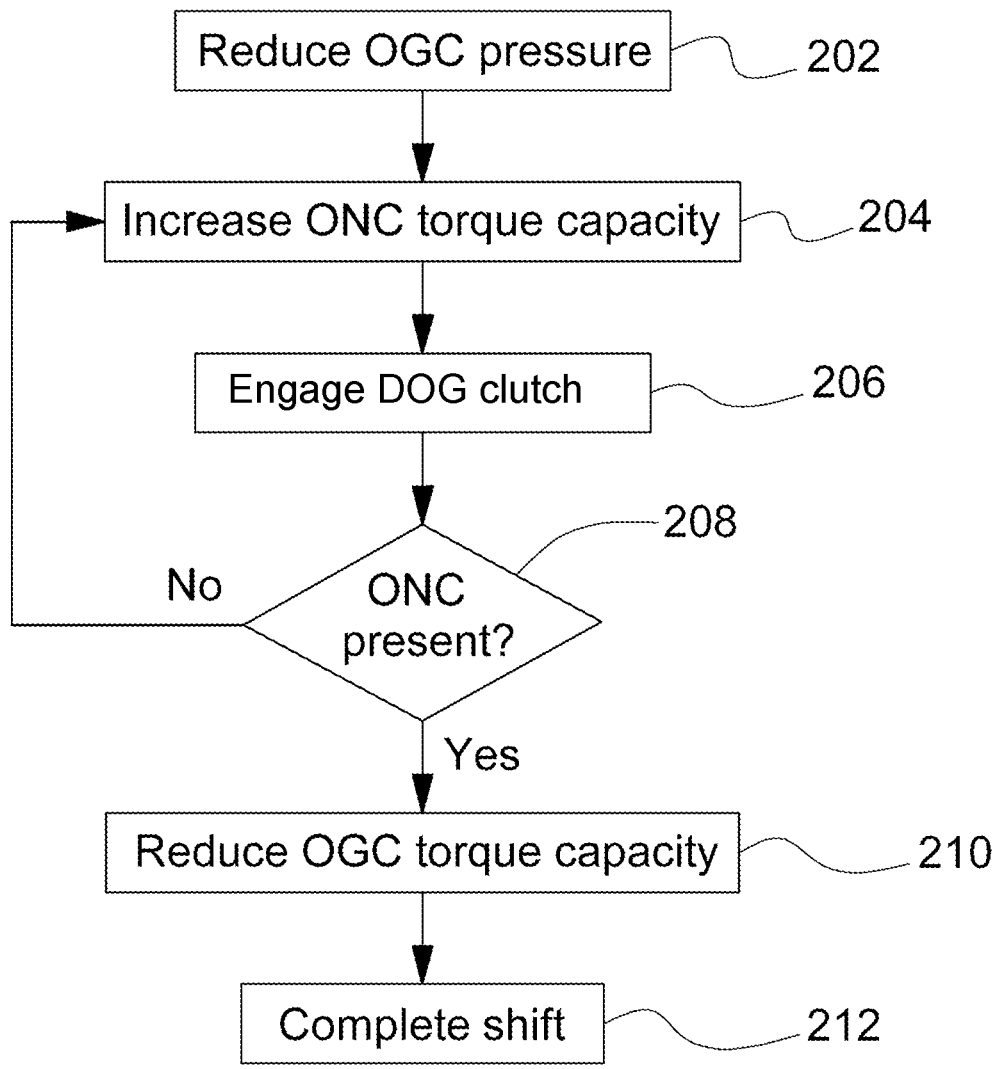
FIG. 6 is a flowchart illustrating a routine for a power-on downshift.

FIG. 6 illustrates a routine 200 for a power-on downshift for the transmission 2, with a dog clutch, from the current gear ratio to the new gear ratio. The routine 200 is a non-limiting example of a control routine to downshift the transmission 2. FIG. 4 will be discussed with reference to FIG. 1. As discussed, the on-coming or off-going element may be the forward friction clutch 95, the direct friction clutch 96, the friction brake 97, the low-and-reverse brake 98, or the overdrive brake 99.

The on-coming and off-going elements are actuated by any suitable means known to one skilled in the art to adjust the on-coming and off-going torque capacities. For example, the on-coming and off-going elements may be pressure actuated. The on-coming and off-going elements are actuated by the controller 4.

In a step 202, in response to the power-on downshift command, the controller 4 reduces the off-going torque capacity to the preliminary off-going torque capacity. Further, in the step 202, torque of the engine 5 is adjusted to a preliminary torque corresponding to the desired shift rate. EQN.'s 1 and 2 are used to calculate the preliminary off-going torque capacity and preliminary torque as functions of the desired torque at the output shaft 24 and desired shift rate while the on-coming torque capacity is approximated as zero.

In a step 204, the on-coming torque capacity is increased to the new on-coming torque capacity. The new on-coming torque capacity is targeted to stop downshifting at an intermediate gear ratio that results in an intermediate speed of the input 18 within an allowed speed range. For example, the allowed speed range may be between 25-50 rotations per minute (RPM) across the on-coming element. For example, the step 204 may stop once a specified percentage of downshifting is complete. Speed of the input 18 is maintained within the allowed speed range by controlling on-coming clutch capacity and engine torque by a suitable method known to one skilled in the art, for example, a PID controller while the on-coming clutch capacity and engine torque are coordinated, for example, by single-input/multiple-output (SIMO) or multi-input/multi-output (MIMO) PID. Alternatively, speed of the input 18 may be maintained within the allowed speed range by varying speed of the input 18 through the intermediate speed—i.e., speed of the input 18 may be increased from a negative speed, through the intermediate speed, to a positive speed, and vice versa. During the step 204, EQN.'s 1 and 2 are used to calculate the off-going torque capacity and the torque at the input shaft 18 as functions of the desired torque at the output shaft 24 and desired shift rate while the on-coming torque capacity is approximated as zero.

In a step 206, the dog clutch is engaged while the off-going element is slipping and the intermediate speed is within the allowed range. When the intermediate speed leaves the allowed range, engagement of the dog clutch may be delayed for a period of time to allow the intermediate speed to return to the allowed range. If the dog clutch fails to engage, the allowed range may be increased to a maximum allowed range. If the dog clutch continues to fail to engage, when the allowed range is increased to the maximum allowed range, the transmission 2 may downshift two gear ratios from the current gear ratio or return to the current gear ratio.

In a step 208, the on-coming element is verified as present by verifying that the on-coming element has a sufficient torque capacity to complete the downshift. The on-coming torque capacity may be measured using a torque sensor or a speed sensor.

When the on-coming element is verified as present, then in a step 210, the off-going torque capacity is reduced while the new gear ratio remains within an allowable gear ratio band. Otherwise, when the on-coming element is not verified as present, the routine 200 returns to the step 204. When engagement of the dog clutch has already been retried, the routine 200 may assume a failure of the on-coming torque element and either return to the current gear or downshift two gear ratios.

Prior to detecting the oncoming torque capacity, EQN.'s 1 and 2 are used in the step 110 to calculate the off-going torque capacity and torque at the input shaft 18 as a function of the on-coming torque capacity, the desired torque at the output shaft 24, and the desired shift rate. After detecting the on-coming torque capacity, EQN.'s 1 and 2 are used in the step 110 to calculate on-coming torque capacity and torque at the input shaft 18 as functions of the desired torque at the output shaft 24 (now a final torque value) and the desired shift rate of zero or to follow a vehicle trajectory reflected by the input shaft 18 while ramping the off-going torque capacity to zero.

In a step 212, downshifting is completed. The off-going torque capacity and engine torque are coordinated to produce the monotonic torque profile while the desired torque at the output shaft 24 is set to a known desired torque and the desired shift rate is set to zero or to follow the vehicle trajectory reflected by the input shaft 18. The off-going torque capacity may be reduced while torque at the input shaft 18 is calculated for the desired torque at the output shaft 24 or torque at the input shaft 18 may be reduced while the off-going torque capacity is calculated for the desired torque at the output shaft 18.

As one skilled in the art will recognize, EQN.'s 1 and 2 may also be used to plan acceleration at the input shaft 18 and torque at the output shaft 24 during a power-on upshift event for the transmission 2. For example, the desired acceleration at the input shaft 18 and torque at the output shaft 24 may be planned when torque at the input shaft 18 and the on-coming torque capacity are calculated using EQN.'s 1 and 2 while the off-going torque capacity is reduced. For example, the engine torque and off-going torque capacity may be controlled while on-coming torque capacity is increased.

While certain embodiments of the present invention have been described in detail, those familiar with the art to which this invention relates will recognize various alternative designs and embodiments for practicing the invention as defined by the following claims.

The invention claimed is:

1. A method of controlling an automatic transmission comprising:
   stroking an on-coming element while pressure for an off-going element is reduced;
   increasing pressure for the stroked on-coming element before reducing pressure for the off-going element below a torque transmitting amount once the stroked on-coming element has a torque capacity sufficient to shift gear ratios, torque capacities for the elements being determined from transmission output torque and acceleration and transmission input torque and acceleration.

2. The method of claim 1 further comprising:
   increasing pressure for the stroked on-coming element based on the transmission output torque, a shift rate, and approximating a torque capacity for the on-coming element as zero.

3. The method of claim 1 further comprising:
   adjusting, while reducing pressure for the off-going element below the torque transmitting amount, the on-coming element pressure and transmission input torque based on the transmission output torque and a shift rate.

4. The method of claim 1 further comprising:
   completing shifting gear ratios by adjusting the transmission input torque and pressure for the on-coming element based on the transmission output torque, a shift rate, and reducing a torque capacity of the off-going element to zero.

5. The method of claim 1 further comprising:
   completing shifting gear ratios by adjusting the transmission input torque and pressure for the off-going element based on the transmission output torque, a shift rate, and adjusting a torque capacity of the on-coming element to produce a zero slip condition.

6. The method of claim 1 further comprising:
   completing shifting gear ratios by adjusting pressure for the off-going and on-coming elements based on a demanded torque, the transmission output torque, and a shift rate.

7. A method of controlling an automatic transmission comprising:
   reducing an off-going torque capacity to a first capacity and adjusting an engine torque to a first torque, in response to a downshift from a current to a new gear ratio, the first capacity and torque based on an on-coming torque capacity approximated as zero, transmission output torque, and shift rate;
   adjusting the on-coming torque capacity to an undetectable capacity greater than a stroke capacity while simultaneously increasing the off-going torque capacity from the first capacity to a second capacity based on the on-coming torque capacity approximated as zero, transmission output torque, and shift rate;
   increasing the on-coming torque capacity from the undetectable capacity to a measureable capacity and adjusting the off-going torque capacity from the second capacity to a holding capacity based on the transmission output torque and shift rate;
   reducing the off-going torque capacity from the holding capacity to zero while adjusting, based on the transmission output torque and shift rate, the engine torque and on-coming torque capacity from the measurable capacity.

8. The method of claim 7 further comprising:
   increasing, prior to reducing the off-going torque capacity to the first capacity, the on-coming torque capacity to above a stroke capacity before decreasing the on-coming torque capacity to zero.

9. The method of claim 7 further comprising:
   completing the downshift by adjusting the on-coming torque capacity and engine torque based on the off-going torque capacity reduced to zero, transmission output torque, and shift rate.

10. The method of claim 7 further comprising:
    completing the downshift by adjusting the off-going torque capacity and engine torque based on the on-coming torque capacity adjusted to a zero slip capacity, transmission output torque, and shift rate.

11. The method of claim 7 further comprising:
    completing the downshift by adjusting the off-going and on-coming torque capacities based on the transmission output torque, shift rate, and a demanded torque.

12. The method of claim 7 further comprising:
    adjusting the on-coming torque capacity to be sufficient to complete the downshift based on a measured transmission output torque, a measured transmission input torque, a measured transmission output acceleration, and a measured transmission input acceleration.

13. The method of claim 7 further comprising:
    adjusting a torque capacity of a transmission friction element based on a measured transmission output torque, a measured transmission input torque, a measured transmission output acceleration, and a measured transmission input acceleration.

14. The method of claim 7 further comprising:
    approximating the on-coming torque capacity as an actual measured on-coming torque capacity.

15. A method of controlling an automatic transmission comprising:
    reducing an off-going torque capacity to a first capacity and adjusting an engine torque to a first torque, in response to a downshift from a current gear ratio to a new gear ratio, the first capacity and torque based on an on-coming torque capacity approximated as zero, transmission output torque, and shift rate;
    adjusting the on-coming torque capacity to a new capacity to produce an intermediate gear ratio within a range of the new gear ratio;
    engaging a dog clutch while an off-going element is slipping;
    detecting the on-coming torque capacity exceeds a minimum capacity to complete the downshift;
    completing the downshift when the minimum capacity is detected.

16. The method of claim 15 further comprising:
    completing the downshift by adjusting the engine torque based on reducing the off-going torque capacity to zero, transmission output torque, and shift rate.

17. The method of claim 15 further comprising:
    completing the downshift by adjusting the off-going torque capacity based on a demanded torque, the transmission output torque, and the shift rate.

18. The method of claim 15 further comprising:
    adjusting the on-coming torque capacity based on a measured transmission output torque, a measured transmission input torque, a measured transmission output acceleration, and a measured transmission input acceleration.

19. The method of claim 15 further comprising:
adjusting a torque capacity of a transmission element based on a measured transmission output torque, a measured transmission input torque, a measured transmission output acceleration, and a measured transmission input acceleration.

20. The method of claim 15 further comprising:
approximating the on-coming torque capacity as an actual measured on-coming torque capacity.

* * * * *